United States Patent [19]

Schoubye

[11] Patent Number: 5,198,206
[45] Date of Patent: Mar. 30, 1993

[54] CONDENSING SULFURIC ACID VAPORS TO PRODUCE SULFURIC ACID

[75] Inventor: Peter Schoubye, Horsholm, Denmark

[73] Assignee: Haldor Topsoe A/S, Denmark

[21] Appl. No.: 623,409

[22] PCT Filed: May 22, 1989

[86] PCT No.: PCT/DK89/00133
§ 371 Date: Dec. 6, 1990
§ 102(e) Date: Dec. 6, 1990

[87] PCT Pub. No.: WO89/12025
PCT Pub. Date: Dec. 14, 1989

[30] Foreign Application Priority Data

Jun. 9, 1988 [DK] Denmark .................... 3125/88

[51] Int. Cl.$^5$ .................... C01B 17/74; C01B 17/82
[52] U.S. Cl. .................... 423/522; 423/528; 423/529
[58] Field of Search .................... 434/522, 528, 529

[56] References Cited

FOREIGN PATENT DOCUMENTS

705824  3/1965  Canada ........................ 423/522
1052188 12/1966 United Kingdom ............. 423/522
2072642 10/1981 United Kingdom .
2117368 10/1983 United Kingdom .

Primary Examiner—Gregory A. Heller
Attorney, Agent, or Firm—Ostrolenk, Faber, Gerb & Soffen

[57] ABSTRACT

When condensing sulfuric acid from gases containing sulfuric acid vapor and steam in excess, e.g. originating from a power station, a substantial decrease of the amount minute droplets of sulfuric acid (the so-called acid mist) escaping to the surroundings is obtained, even in cases where the sulfuric acid plant is equipped with an aerosol filter, if minute nucleation cores are incorporated into the gas in an amount of $10^9$ to $10^{12}$ solid particles per Nm$^3$ per 0.1 % H$_2$SO$_4$-vapor in the gas. The nucelation cores may, e.g., be generated by combusting hydrocarbons with >2 carbon atoms or silicones, or added as smoke from an electric arc or welding.

19 Claims, 4 Drawing Sheets

CONDENSING SULFURIC ACID VAPORS TO PRODUCE SULFURIC ACID

FIELD OF THE INVENTION

The present invention relates to a process in the production of sulfuric acid to condense sulfuric acid vapours from a gas mixture containing 0.01 to 10% by vol. of $H_2SO_4$ vapour, calculated under the assumption that $SO_3$ is fully hydrated, and 0 to 50% by vol. of aqueous vapour, by direct or indirect cooling in a sulfuric acid tower.

BACKGROUND OF THE INVENTION

When producing sulfuric acid the acid is in many cases obtained in the form af vapours of $H_2SO_4$ in admixture with aqueous vapour (i.e. steam). This is for instance the case in the important sulfuric acid process which consists of a catalytic oxidation, normally over an alkali promoted vanadium catalyst, of $SO_2$ to form $SO_3$ which is subsequently hydrated by steam to form sulfuric acid vapour, and that must be condensed in a cooling process. This sulfuric acid process is important, i.a., in connection with the purification of flue gases for sulfur.

When condensing the sulfuric acid vapours, which can take place by cooling under various circumstances, a socalled acid mist (sulfuric acid mist) is formed, i.e. a kind of aerosol consisting of very small droplets of sulfuric acid in the gas mixture from which the sulfuric acid is condensed and which will normally contain steam in a larger amount than that needed for the full hydration of $SO_3$ into $H_2SO_4$. It important to prevent the escape of substantial amounts of the acid mist to the surroundings; for environmental reasons a maximum of escape of sulfuric acid mist is fixed at about 40 mg $H_2SO_4/Nm^3$, corresponding to 9 ppm $H_2SO_4$.

It is known to regulate the escape of acid mist by regulating the temperature of the coolant. Thus, there is described in DK patent specification No. 145,457 (U.S. Pat. No. 4,348,373) a process for preparing concentrated sulfuric acid from gases containing $SO_3$ and excess of $H_2O$. The gas is cooled and the sulfuric acid condensed and concentrated in two steps in an absorption tower containing filler bodies. In the lowermost step the feed gas is passed upwardly countercurrently with the condensed acid,the concentration of which is thereby increased In the subsequent step the sulfuric acid vapour is absorbed in sulfuric acid recycled through the layer containing filler bodies. The content of sulfuric acid mist is kept down by virtue of a specified regulation of the temperature; by this the recycle acid is removed from the tower. Remaining acid mist is removed in an aerosol filter placed after the absorption zone. The filter is a "low velocity" filter operating at a linear velocity below 1 m/s and with a pressure drop above 20–30 mbar.

From DK patent application No. 1361/82.(GB patent specification No. 2,117,368) there is known a process for preparing sulfuric acid in which sulfuric acid vapour in gases containing 0.01 to 10% $H_2SO_4$ vapour and 0 to 30% steam is condensed in vertical, 9as cooled, acid resistant tubes. The presence of large amounts of acid mist in the gas after the condensing is avoided according to this patent by keeping the temperature difference between the sulfuric acid-containing gas streaming in an upward direction and the coolant streaming in a downward direction (optionally in part crosscurrently) within certain specified limits.

The process known from this publication has been improved according to DK patent application No. 2989/88 so as to be particularly but not exclusively suitable for use when condensing sulfuric acid from gases having a low content of vapours of $H_2SO_4$. Such gases may originate from flue gases and other industrial waste gases; $SO_2$ therein has then been oxidized to $SO_3$ over a sulfuric acid catalyst and reacted with steam. The condensation takes place in a large number of tubes which each in the top has a small filter causing a drop of pressure of typically 5 to 10 mbar, the gas containing sulfuric acid flowing in an upward direction in countercurrent with the gaseous coolant flowing in a downward direction externally around the tubes. A prerequisite for the ability of this filter to separate the acid droplets/acid mist (and to allow sulfuric acid to flow downwards through the tubes in countercurrent with the gas) down to a residual content of the abovementioned about 40 mg/$Nm^3$ is that the temperatures $TA_1$ and $TA_2$ of the cooling air to and from, respectively, the condenser and the temperature $T_2$ of gas leaving the tube and filter satisfy the following three conditions:

$$TA_2 > T_d - 30 - 10\alpha\ °C. \quad (1)$$

$$T_2 < T_2^{*\ °}C. \quad (2)$$

$$T_2 - TA_1 < 90° C. \quad (3)$$

wherein $T_d$ is the sulfuric acid dew point of the feed gas passed to the tubes, $\alpha$ is the percentage by volume of $H_2SO_4$ in this gas under the assumption that $SO_3$ is completely hydrated to $H_2SO_4$ and $T_2^*$ is the temperature at which the vapour pressure of $H_2SO_4$ is about 2 x $10^{-6}$ bar in equilibrium with the partial steam pressure prevailing at the outlet of the top of the tubes (corresponding to about 2 ppm sulfuric acid vapour; $T_2^*$ usually is between 100 and 125° C.)

In the following the expression "sulfuric acid tower" means a packed absorption tower as described in U.S. patent specification Ser. No. 4,348,373 (DK 145,457) or a tower containing tubes as described in one of the other publications mentioned above.

BRIEF DESCRIPTION OF THE INVENTION

It has, however, been surprisingly found that the filterability of the droplets in the acid mist is highly dependent on the content of small particles in the gas before the condensing starts, under otherwise the same conditions of operation. These particles serve as nuclei around which the sulfuric acid vapour condenses, socalled nucleation cores or nucleation seeds.

More fully explained the content of acid mist in the gas discharged to the surroundings from a sulfuric acid tower is reduced if according to the invention the gas tower containing the sulfuric acid vapours of which is to be condensed is given a content of $10^9$ to $10^{12}$ solid particles per $Nm^3$ per 0.1% $H_2SO_4$-vapour before the inflow of the gas into the sulfuric acid tower, calculated under the assumption that $SO_3$ here is completely hydrated to $H_2SO_4$.

This process is universal and may be used both in industrial processes having the production of sulfuric acid as the main purpose and in the production of sulfuric acid,including highly concentrated sulfuric acid,as a by-product from the purification of industrial waste gases, for instance flue gases from power stations.

According to the invention the nucleation according to the invention thus may be carried out under cooling in a packed sulfuric acid tower in countercurrent with circulating sulfuric acid as coolant, in other words utilizing otherwise the process known from DK patent specification No. 145,457 (U.S. Pat. No. 4,248,373).

The process according to the invention may also be practized under cooling of the gas mixture containing sulfuric acid in substantially vertical, externally cooled tubes in which the gas mixture flows from the bottom in an upward direction in countercurrent with a preferably gaseous external coolant, i.e. in accordance with the method known from GB patent specification No. 2,117,368.

The invention has especially been useful in combination with the process known from DK patent application No. 2989/88 and an advantageous embodiment consequently is characterized in using it when condensing the sulfuric acid vapours which after the condensing flow downwards through the tubes as liquid, highly concentrated sulfuric acid, said $H_2SO_4$-vapours coming from gases containing 0.01 to 10% by vol. of $H_2SO_4$ vapour, calculated under the assumption made hereinbefore, and 0 to 50% by vol. of steam, the gas being admitted from the bottom at a temperature of at least the sulfuric acid dew point at the conditions of pressure and temperature prevailing in the tube, and being cooled during the flow in the upward direction to an exit temperature $T_2$ which is lower than the temperature at which the vapour pressure of $H_2SO_4$ is about $2 \times 10^{-6}$ bar in equilibrium with the partial pressure of steam prevailing at the outlet of the tubes in the top, the tubes being cooled externally with a gaseous medium flowing substantilaly countercurrently with the sulfuric acid-containing gas, said gaseous medium thereby being heated from an inlet temperature $TA_1$ of 0–50° C. to an outlet temperature $TA_2$ satisfying the condition $$TA_2 > T_d - 30 - 10\alpha° C.$$

where $T_d$ and $\alpha$ have the meanings defined hereinbefore.

DETAILED DESCRIPTION OF THE INVENTION

The process according to the invention will be described more fully in the following, partly with reference to the drawings in which FIG. 1 schematically shows a plant suitable for carrying out the process according to the invention.

FIGS. 3 and 4 are identical with FIGS. 2 and 3 in DK patent application No. 2989/88

Figure 1:
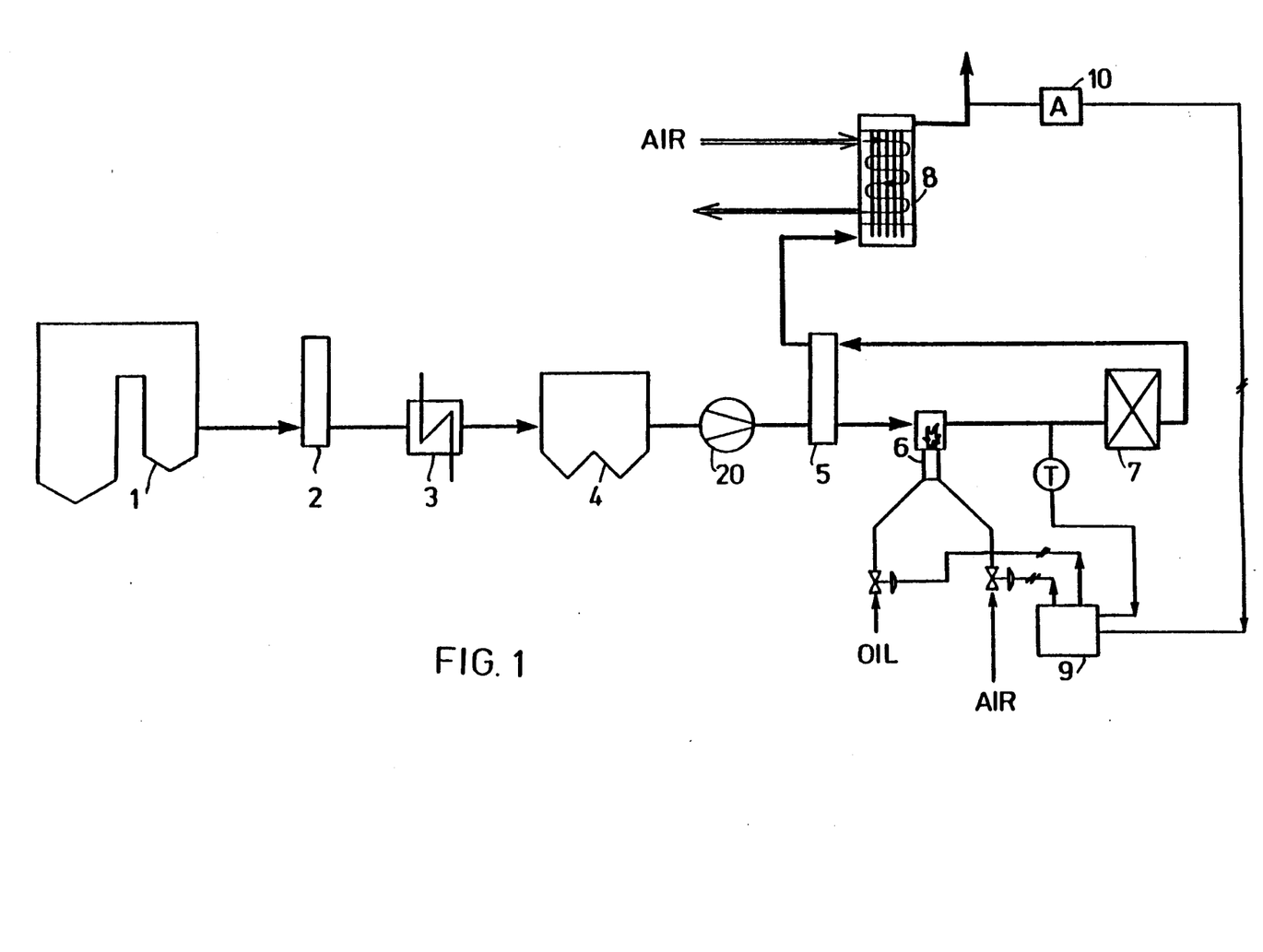

In FIG. 1 a plant is shown in which the process according to the present invention may be expediently carried out in connection with the purification of the smoke from a power station boiler stoked with sulfur-containing coal or oil. The smoke from a boiler -1 is cooled in an air preheater 2 and then in a trim boiler 3 to about 200° C. ahead of a dust filter 4 in which the content of fly ash and dust particles of the smoke is separated to a content of below 20 mg/Nm³, preferably to below 5 mg/Nm³, by the aid of a bag filter. Amongst various types of bag filters especially those are preferred that contain a membrane of "Teflon" ® (polytetrafluoroethylene) which hold back all particles down to a diameter below 0.01 μm. The smoke is then heated in a heat exchanger 5 to about 390° C., and by direct heating with an oil burner 6 heated to 420° C. in a reactor in which about 96% of the content of $SO_2$ in the gas is converted to $SO_3$ by the aid of an alkali promoted vanadium catalyst This catalyst has the further property that in operation it catches about 95% of the remaining contents of dust in the gas, this because the surface of the catalyst is moistened with a melt of alkali pyrosulfates. The $SO_3$-containing gas is thereafter cooled in the heat exchanger 5 to about 250° C. whereby the major part of the content of $SO_3$ in the gas is hydrated to $H_2SO_4$ vapour which is thereafter condensed to liquid sulfuric acid in vertical, air-cooled glass tubes in a sulfuric acid condenser 8 (glass tube tower) in which the gas is cooled to 100° C. and the cooling air is at the same time heated from typically 20° C. to 190° C. The glass tubes have the same dimensions and operate at the same conditions as simulated in the experimental apparatus shown in FIG. 3, except that the air flows crosscurrently and six strokes in countercurrent with the gas in the tubes. At the top of each of the glass tubes there has been mounted a drop filter for separating droplets of sulfuric acid as described in Danish patent application No. 2989/88. Filter 4 and $SO_2$ reactor 7 normally will ensure that the number of particles in the gas is smaller than optimum for the separation of sulfuric acid in the drop filters, which of course is a prerequisite for optimizing the separation of acid droplets by the addition of particles to the gas stream.

Reference numeral 20 denotes a blower which in many cases may advantageously be placed at this site of the plant; in other cases it is presupposed to be present somewhere else in the total installation, e.g. as a blower of fresh air to the boiler.

In the plant shown in FIG. 1 the addition of nucleating particles takes place by the aid of an oil fired support burner 6 which thereby has two functions controlled automatically by the aid of a process computer 9, viz. to keep the temperature of the gas passed to the $SO_2$ converter at a fixed temperature (420° C.), which is achieved by regulating the introduction of the oil into the burner; and to generate the optimum amount of nucleation particles, which takes part by a simultaneous regulation of the ratio air/oil passed to the burner in such way that the signal to the process computer from an automatically operating acid mist meter 10 in the gas after the sulfuric acid condenser shows a minimum of content of acid mist in the gas, or at least that the content of acid mist is below a fixed maximum of 10 ppm $H_2SO_4$. The process computer performs the regulation according to commonly known principles. If instead of heating the gas before the $SO_2$ reactor with an oil or propane gas fired burner it is chosen to use indirect heating, the addition of particles may expediently take place as smoke from an electric arc or from burning hydrocarbons, or an aerosol of a solution of, e.g., iron sulfate. The rate of the addition of particles is regulated by the aid of a regulation loop containing a continuously operating meter for the content of acid mist in the gas after the sulfuric acid condenser. As dust filter a bag filter is preferred because this ensures best that the particles will be present in deficit.

Figure 3:
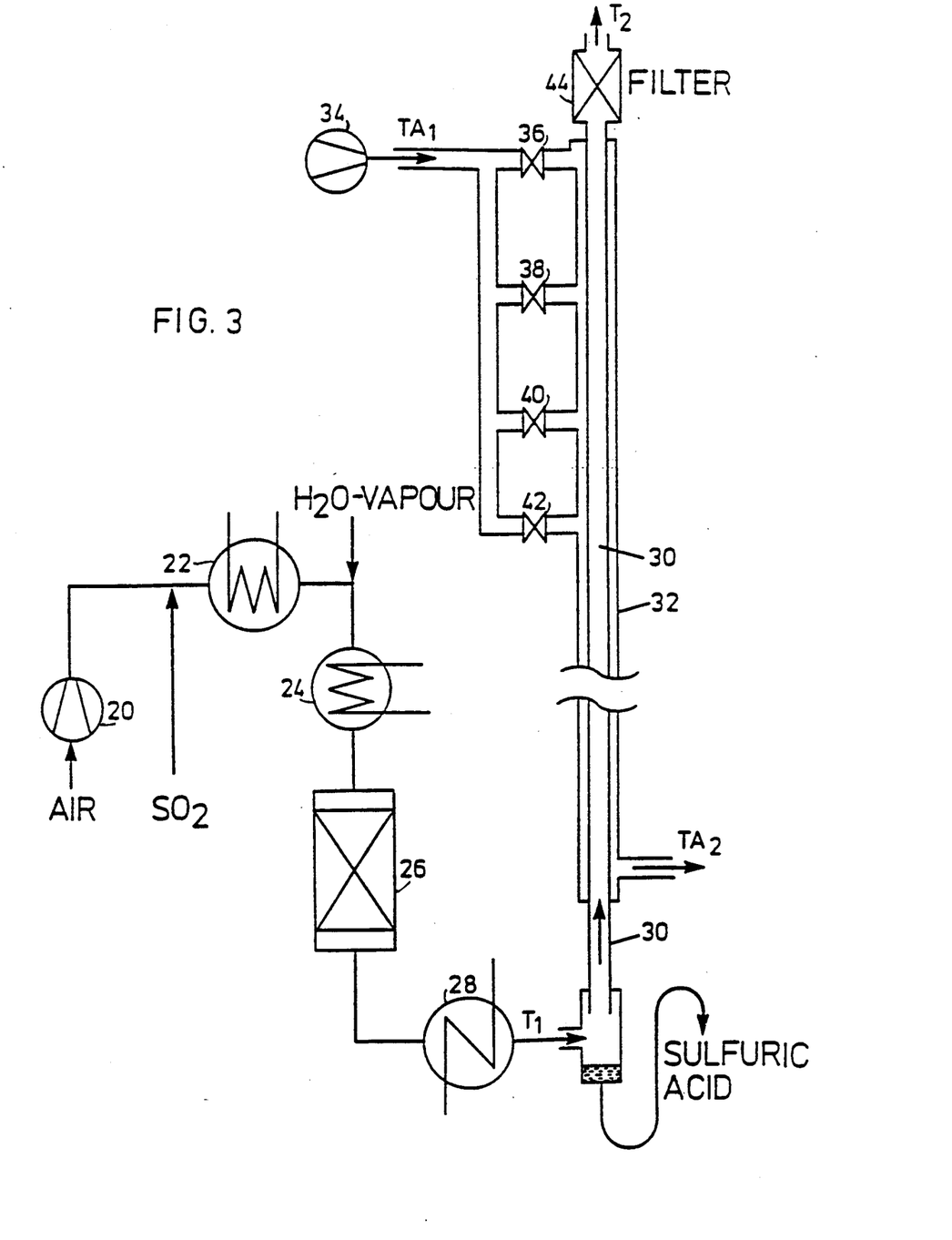

Whereas an operating plant as shown in FIG. 1 contains a very large number of tubes, e.g. for a power station having a capacity of 300 MW a number of the magnitude of 60,000 tubes, the experimental plant shown in FIG. 3 contains one tube only. It has a capacity to treat up to 20 $Nm^3/h$ gas containing sulfuric acid, prepared by taking in air from the room by the aid of a blower 20, heat the air in an electric heater 22 and mix it with steam and gaseous $SO_2$ to obtain a desired gas composition. The gas mixture is heated further to about 420° C. in an electric heater 24 after which it is passed through a catalytic reactor 26 in which about 96% of the content of $SO_2$ in the gas is oxidized to form $SO_3$ by the aid of a sulfuric acid catalyst of known type containing vanadium and potassium as active components. Subsequently the gas is cooled in a heat exchanger 28 to about 250° C. ($T_1$) before entering a sulfuric acid condenser consisting of a single glass tube 30 having a length of 6 m, an i.d. (inner diameter) of 36 mm and an o.d. (outer diameter) of 40 mm. In the upper 5.4 m of the length of the glass tube it is encased in a bigger tube 32 through which cooling air is passed from a blower 34, causing the gas stream in tube 30 to be cooled countercurrently with the air stream in the outer tube The outer tube is insulated with 100 mm mineral wool. The cooling air can be introduced via one of a plurality of valves 36, 38, 40 and 42; hereby the cooled zone can be adjusted to 5.4, 4.95, 4.55 or 4.05 m, respectively. The conditions of flow of the cooling air are adapted in a manner such that the heat transmission value (hv) at the outer side of the tube is as in a corresponding tube in an industrial plant.

Figure 4:
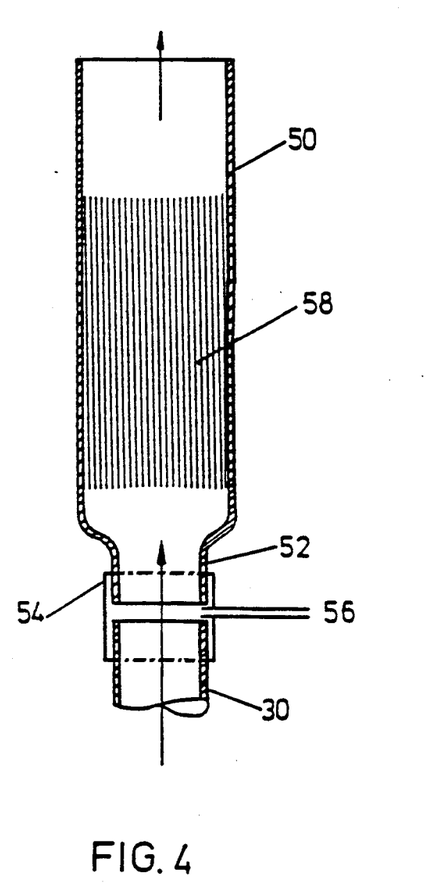

FIG. 4 shows one of several possible filter types for use in the experimental plant. FIG. 4 is identical with FIG. 3 in DK patent application No. 2989/88 and that filter is denoted filter A. It consists of a cylindrical glass tube, hereinafter denoted filter cartridge 50, having an inner diameter of 46 mm and a length of 200 mm. The filter cartridge 50 in the bottom has a neck 52 the outer diameter of which is 40 mm; by the aid of an outer tightly fitting "Teflon" ®sleeve 54 it is connected to the glass tube 30 having the same outer diameter. The drop of pressure through the filter cartridge is measured by the aid of a branched pipe 56 led through the sleeve. A filter medium 58 is placed in the filter cartridge; it consists of filaments of a fluorocarbon polymer having a thickness of 0.3 mm and knitted to form a web having a width of about 150 mm, the web being rolled to fit into the cartridge. This roll has the same diameter as the internal diameter of the filter cartridge. The filamentous material constitutes about 7% of the volume of the roll. When the droplets of sulfuric acid present in the gas move upwards through the roll the droplets are caught and agglomerate to form large drops which flow downwards in countercurrent with the gas and pass further down in the glass tube.

A number of experimental results have been reported in DK patent application No 2989/88, in part by the aid of Tables. Some of Table 1 of that application has been repeated hereinafter as Table 1; in this $T_1$ is the temperature of the gas at the inlet into the tubes, m/s denotes the gas velocity through the filter, expressed in meters per second, and $\Delta p$ is the drop of pressure through the filter, expressed in mbar millibars). $T_d$, $TA_1$ and $T_{A2}$ have the meanings given hereinbefore.

When repeating these experiments it was surprisingly found that by otherwise unaltered conditions of operation one measured a significant drop in the content of acid mist after the filter when smoke from a cigarette, sparks from a grindstone or smoke from electrowelding etc. was added to the air supplied to the blower 20 (FIG. 3); or when smoke from the combustion of hydrocarbons containing more than two carbon atoms in the molecule was added, provided that the air/fuel ratio was adjusted to render the flame faintly luminous. When larger amounts of smoke were added the content of acid mist after the filter again increased strongly. The acid mist content after the filter in the experiments reported in Table 1 could also be influenced strongly by altering solely the charge on the blower 20 used in these experiments; the blower was an ordinary domestic vacuum cleaner of the brand "Nilfisk" ®, equipped with a commutator motor which is cooled by the air passing the blower The content of droplets of sulfuric acid in the gas after the filters dropped significantly when the load on the motor was increased by throttling a valve inserted in the air stream before or after the blower. At the stronger load the commutators will sparkle more, whereby an increased amount of particles of coal and metal are delivered to the air from the electrical point of contact with the rotor of the motor. These observations are described more fully in the following.

The measurings of the acid mist were carried out with a continuously operating photometric aerosol meter which was frequently calibrated by chemical determinations of the content of $H_2SO_4$ in the gas; the determinations were made according to the method described in EPA directive EPA-600/3-84-056 (April 1984). The conditions of operation so far as flow, temperatures, length of the cooling zone and drop of pressure are concerned, were selected from Table 1 and now repeated with varying contents of nucleation particles By repeating experiment No. 1-1 the following contents of $H_2SO_4$ in the gas after the filter A were found.

a) 6 to 10 ppm when using pure inlet air and the same motor load as in the original experiment;

b) the acid mist dropped to about 1 ppm when increasing the load to a value near the load limit of the motor, after which the acid mist appeared to increase anew when overloading the motor;

c) 50 to 100 ppm with pure air when instead of the abovementioned vacuum cleaner there was employed a blower in which the air did not come into contact with the motor. Purification of the inlet air in a bag filter did not alter the content of acid mist appreciably.

Figure 2:
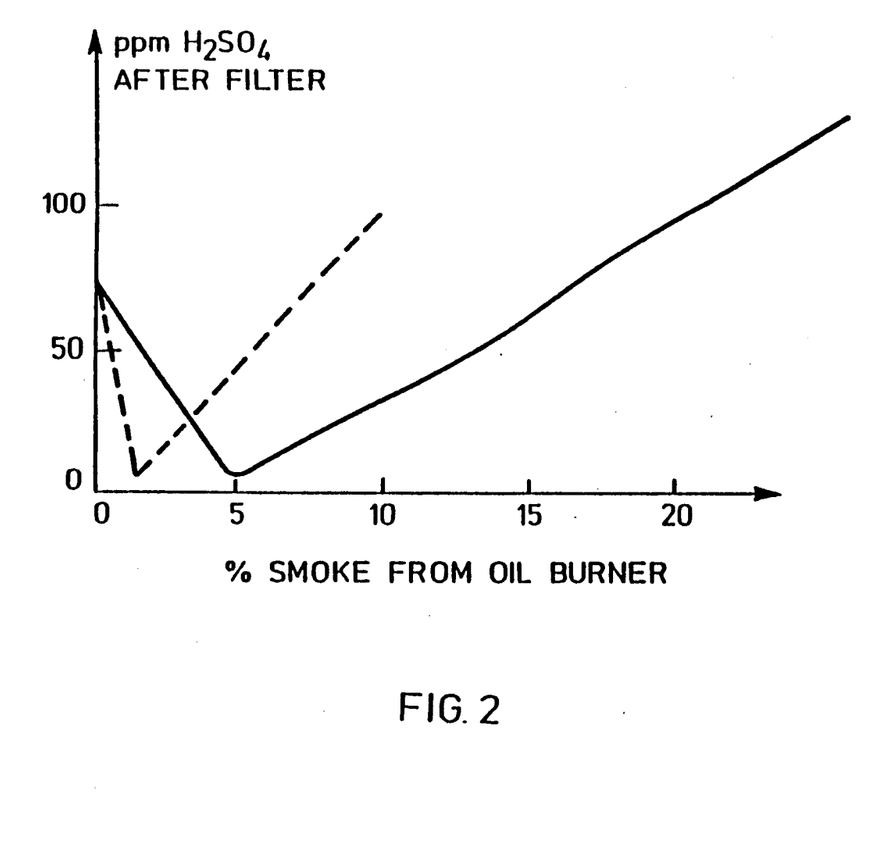
FIG. 2 represents curves showing the content of acid mist in the discharge gas after an aerosol filter and after the addition of varying amounts of solid particles, FIG. 3 schematically shows an experimental apparatus, and FIG. 4 a filter employed in this apparatus.

In the following experiments a blower was used in which the air did not come into contact with the motor.

d) The addition of a few $cm^3$/sec. welding smoke from electrowelding with, e.g.,iron electrodes to the feed gas at 14 $Nm^3/h$, caused the acid mist after the filter to drop anew to 0 to 1 ppm $H_2SO_4$. Larger amounts of welding smoke, however, increased the acid mist drastically. By the addition of about 100 $cm^3$/sec. welding smoke the content of acid mist rose to almost 1000 ppm, which means that almost all of the content of $H_2SO_4$ in the inlet gas to the tube passed through the aerosol filter A. Another embodiment of the filter, denoted B1, with the same drop of pressure as filter A, was not more efficient than filter A whereas a filter B2 (A, B1 and B2 refer to the filters employed in DK 2989/88) removed the acid mist down to 50 to 100 ppm after the filter when overdosing the welding smoke.

e) The acid mist also disappeared to below 1 ppm $H_2SO_4$ by the addition to the feed gas of an aerosol of iron sulfate particles prepared from an aerosol in air of droplets of a 20% solution of ferrous sulfate which was atomized by the aid of compressed air, after which the content of water in the droplets was evaporated at 300° C. before the solid residue was added to the gas. It was necessary to atomize 5 to 10 cm$^3$/min. of the solution of iron sulfate in order to obtain optimum removal of the acid mist.

f) The addition to the gas before the $SO_2$ reactor of smoke from the combustion of Diesel oil in an oil burner gave the effect illustrated in FIG. 2 on the content of acid mist after the aerosol filter. The addition of about 5% oil smoke in the gas passed to the condensing tube reduced the acid mist to 0 to 1 ppm whereas the addition of larger amounts of oil smoke caused the content of acid mist after the filter to rise to several hundred ppm $H_2SO_4$. By lowering the excess of air in the flame so as to render the flame more yellow, yet without sooting appreciably, the amount of oil smoke (the dash line in FIG. 2) needed to reduce the content of acid mist to the minimum of 0 to 1 ppm was lowered. This indicates that very minute coal particles in the smoke act as nucleation particles and that the particles entirely or partly pass through the $SO_2$ reactor for the catalytic oxidation of $SO_2$ without getting combusted.

g) Smoke from the combustion of propane and butane had substantially the same effect on the acid mist as had smoke from oil firing. Smoke from the combustion of ethane had a weaker effect and was only active at air deficit. Smoke from the combustion of methane had no effect on the acid mist, not even at air deficit, supposedly because the methane flame could not be caused to produce carbon particles in this experiment.

h) The insertion in the gas stream before the $SO_2$ reactor of a very efficient bag filter having a "Telon" ® membrane, which detains all particles of a size above about 0.01 µm, gave a content of $H_2SO_4$ after the aerosol filter of 50 to 100 ppm $H_2SO_4$ irrespectively of how much air was added before the bag filter from a sparkling commutator motor, welding smoke or smoke from combusting hydrocarbons as described under f) and g).This shows that particles and no other parameters in connection with the experiments just reported caused the effect demonstrated on the content of $H_2SO_4$ in the gas after the aerosol filter.

In other experiments repeating the conditions of operation reported in Tables 1, 2 and 3 in DK 2989/88 it was found that under such conditions one must observe the rules laid down as conditions (1), (2) and (3) hereinbefore,whereas they cannot be transferred directly to the process known from e.g. DK 145,457 in which the coolant is condensed sulfuric acid.

The addition of particles to the gas only alters the width of the temperature range and the minimum content of $H_2SO_4$ obtainable after the aerosol filter. This is due to the fact that the presence in the feed gas of either a too low or a too high content of particles causes narrowing of the range and an increase of the minimum content of $H_2SO_4$ obtainable after the filter and/or an increase of the drop of pressure over the filter necessary to obtain a certain minimum content of $H_2SO_4$. Incidentally, it has been ascertained that the removal of acid mist has its highest sensitivity to variations in the particle content of the gas at concentrations of $H_2SO_4$ below about 0.5% in the feed gas and that the optimum particle concentration increases almost proportionally to the $H_2SO_4$-concentration up to about 0.5% $H_2SO_4$ in the feed gas. At higher concentrations of $H_2SO_4$ the increase of the concentration of solid particles needed to minimize the acid mist seems to approach zero. At 6% $H_2SO_4$ in the feed gas an effect of the particle concentration can still be seen and it appears to have its optimum at a concentration between 2 and 10 times the optimum particle concentration at 0.5% $H_2SO_4$. It is observed that at 6% $H_2SO_4$ and a feed gas stream below 11 Nm$^3$/H per glass tube (having an inner diameter of 36 mm) and optimum temperature conditions and optimum content of particles it is possible to obtain below 10 ppm $H_2SO_4$ in the outlet gas from the tube without filtering the gas in or after the tube.

In the experiments conducted so far it has not been possible to make absolute measurings of the amount or the size of the particle added during the experiments described. The content of particles in the optimum smoke produced by the combustion of hydrocarbons gave no or only faintly visible haziness in the smoke whereas the active welding or cigarette smoke is bluish, this indicates that the particles must be smaller than about 0.6 µm. The "Telfon" ® membrane filter discussed under h) according to the manufacturer removes particles down to below 0.01 µm but attempts at studying the particles from oil smoke and welding smoke caught on such a filter failed, probably because they penetrate into the filter. However, one can estimate the optimum concentration of particles on the basis of the following considerations on the mode of operation of the particles:

During the condensing of the sulfuric acid in the tubes the $H_2SO_4$ vapour in the gas film on the tube walls is supercooled. In case of a genuine film condensing the sulfuric acid vapour diffuses through this supercooled gas film and condenses on the walls. Sulfuric acid vapour presumably (because of the low surface tension of sulfuric acid) cannot be supercooled more than 10–30° C. below the dew point before a spontaneous nucleation of sulfuric acid droplets takes place in the supercooled film. The supercooled acid vapour continues to condense on these droplets and when passing upwardly through the tube they will grow to a size such that they are either thrown out onto the tube wall, or can be easily removed by a coarse drop filter in the top of the tube; this provided that there is not formed too many droplets relative to the amount of acid vapour at the disposal of the growth of the drops. An increased temperature difference between the gas in the tubes and the coolant on the other side of the tube wall causes an increased supercooling of the film and thereby an increased number of droplets; this causes, notably at low contents of $H_2SO_4$ in the feed gas, that the droplets do not reach the size of at least 2 µm which is essential to allow them to be separated in the drop filters while causing drops of pressure below 10 mbar. It is difficult to control this spontaneous nucleation in the gas phase and it involves serious limitations in the operation of the process; these limitations are avoided by the controlled addition to the feed gas of particles acting as nucleation cores to form precizely the optimum number of droplets of sulfuric acid. When too many particles are present too many droplets are formed and thereby a difficultly filtrable acid mist is formed; if on the other hand too few particles are present the supersaturation/supercooling will be to high and cause spontaneous nucleation It does not seem that there is any limitation with respect to the chemical composition of the solid particles, or with respect to their size,to enable them to act as nucleation cores. However, they should be as small as possible in order to be able to pass, for instance, a catalytic reactor for the oxidation of $SO_2$, and in order to cause no noticeable pollution of the sulfuric acid produced Based on the assumption that each particle forms one acid droplet, it can be easily calculated from the formula below that there is requested, for example, $2.6 \times 10^{11}$ particles/$Nm^3$ to condense 0.1% of $H_2SO_4$ in the feed gas in the form of droplets of sulfuric acid having a size of 3 μm, the droplets being separated in the filter at a concentration of 75% sulfuric acid and a density of 1.6 g/$cm^3$. As far as orders of magnitude are concerned this is in accordance with experiment d) reported hereinabove and carried out with welding smoke. The welding smoke admitted contained about 1 gram of iron oxide per $Nm^3$, probably having an average diameter of 0.1 μm. Accordingly, the smoke contained about $6 \times 10^{14}$ particles per $Nm^3$; this corresponds to an addition of about 1.6 $cm^3$ welding smoke per second in order to obtain $2.6 \times 10^{11}$ particles/$Nm^3$ in the 14 $Nm^3$/h of feed gas to the tube. In spite of big uncertainties in such calculations, this is consistent with what was established experimentally. At least it can be concluded with a good range of certainty that for optimum separation of the droplets of sulfuric acid there should be added between $10^9$ and $10^{12}$ particles present per $Nm^3$ feed gas to the tubes per 0.1% $H_2SO_4$ vapour in the feed gas. It is important for the purity of the condensed sulfuric acid that the nucleation particles are small. For instance, $2.6 \times 10^{11}$ particles having a size of 0.1 μm per 0.1% $H_2CO_4$ in the gas would give a content of 80 ppm by weight of "iron oxide" in the concensed sulfuric acid, whereas particles having a size of 0.05 μm would give 10 ppm in the acid.

According to the invention one therefore cools the gas mixture in substantially vertical, externally cooled tubes wherein the feed gas flows from the bottom in an upward direction countercurrently with an external coolant which is preferably gaseous.

Conveniently there has been mounted near, in or on the top of each tube, in gastight connection therewith, a means for separating droplets of sulfuric acid present in the gas. Means should also be arranged to ensure that the droplets flow back, downwards through the tube.

The relationship between n = the number of particles or droplets per $Nm^3$ of the gas; c = the content of particles or droplets in the gas expressed as g/$Nm^3$; σ = the density of the particles or droplets expressed in g/$cm^3$; and d = the diameter of the particles or droplets expressed in cm (1 cm=10,000 μm), is $$n = 6c/(\sigma \pi d^3) number/Nm^3 \quad (4)$$

The concentration c of sulfuric acid droplets in the gas is calculated from the expression:

$$c(sulfuricaciddroplets) = 4380 \times \alpha/\beta g droplets/Nm^3 \quad (5)$$

where α is the percent per volume of $H_2SO_4$ vapour corresponding to c under the assumption that the droplets were all evaporated, and β is the percent by weight of $H_2SO_4$ in the droplets (β is typically 75%w $H_2SO_4$).

To avoid that the gas during the condensing contains too big a number of particles it is possible to purify the gas for its content of solid particles before the addition of the solid particles as described, preferably by the aid of a bag filter.

In practice it is convenient according to the invention to add the solid particles to a gas stream containing $SO_2$ and a stoichiometric excess of $H_2O$ and subsequently pass the gas stream with this admixture through a layer of a sulfuric acid catalyst at a temperature of 360° to 500° C. for the oxidation of $SO_2$ into $SO_3$ which is hydrated under the action of steam, and if desired to cool the gas stream to 0-200° C. above its sulfuric acid dew point before it is fed to the sulfuric acid tower.

Expediently the particles are added by the admixture of smoke from the combustion of hydrocarbons, preferably having at least 2 carbon atoms per molecule, either the air/fuel ratio λ of the burner or the added amount of hydrocarbons being regulated by the aid of an automatic regulation loop containing an analyzer for measuring the content of sulfuric acid droplets in the gas after it has left the sulfuric acid tower or the means for separating droplets of sulfuric acid, signals from the analyzer continuously adjusting and correcting λ or the added amount of smoke so as to ensure that the content of sulfuric acid droplets in the gas becomes as Small as possible and preferably below 10 ppm $H_2SO_4$ in the discharge gas.

When the smoke gas from the boiler contains a high concentration of particles having a size below 1 μm, which is frequently the case when firing with coal dust, it is even possible according to the invention to give the gas passed to the sulfuric acid condenser the desired content of nucleation particles by the controlled addition of small particles from the flue gas by the following method: The fly ash-containing gas from the boiler is subdivided into a stream, normally a main stream, from which all or nearly all of the particles are removed in an efficient bag filter, e.g. in a bag filter equipped with "Teflon" ® membranes, and another, normally lesser stream which is regulated in the above manner and which is caused to bypass the filter and is subsequently admixed into the main stream ahead of the sulfuric acid condenser. It is especially convenient to admix said second stream into the first one before the $SO_2$ reactor in order to thereby oxidize its content of $SO_2$ to form $SO_3$, and furthermore to remove the content in the lesser stream of coarse particles, above about 1 μm, for instance in a cyclone or a small electrostatic filter, because the coarse particles will settle in the $SO_2$ reactor and also will pollute the condensed sulfuric acid without contributing substantially to the nucleation.

However, it may also be advantageous to add the particles in the form of smoke from metal or metal oxides generated in an electric arc in which the amount of particles added per unit of time is regulated in a way so as to obtain minimum content of droplets of sulfuric acid after the gas has left the tube or the means for separating droplets of sulfuric acid.

It has proven particularly expedient to add the particles by combusting silicone oils in admixture with a fluid hydrocarbon fuel (in this specification "fluid" means either liquid or gaseous) in a burner, in a manner such that the smoke from the burner contains particles of $SiO_2$. This smoke is mixed with the flue gas before it enters the sulfuric acid tower; and preferably between dust filter 4 and blower 20 in FIG. 1. When combusting in this manner Diesel oil admixed with 0.05 to 0.5 % w of silicone oil, or when mixing vapours of siloxanes having a vapour pressure above 0.01 mbar into the combustion air to pass to the burner, it is only necessary to add about $4 \times 10^{-8}$ g of $SO_2$ per $Nm^3$ flue gas containing 0.1% $H_2SO_4$ vapour to obtain optimum separation of acid mist; this corresponds to a diameter of about 50 Å (Ångström units) of the particles of $SiO_2$.

TABLE 1

Experiments with feed gas containing 1000 ppm $H_2SO_4$ + 7% $H_2O$. $T_d$ = 185° C. $TA_2$ > 155° C. Dew point for 2 ppm $H_2SO_4$ and 7% $H_2O$ is 109° C.

| Exp. No. | Feed stream, $Nm^3/h$ | Cooled zone, m | $T_1$ °C. | $T_2$ °C. | $TA_1$ °C. | $TA_2$ °C. | ppm $H_2SO_4$ before filter | ppm $H_2SO_4$ after filter | m/s | Δp |
|---|---|---|---|---|---|---|---|---|---|---|
| 1-1 | 14 | 5.4 | 250 | 100 | 20 | 194 | 600 | 8 | 3.2 | 8 |
| 1-2 | 14 | 4.95 | 250 | 100 | 20 | 184 | 600 | 8 | 3.2 | 8 |
| 1-3 | 14 | 4.5 | 250 | 100 | 20 | 170 | 700 | 10 | 3.2 | 8 |
| 1-4 | 14 | 4.05 | 250 | 100 | 20 | 151 | 700 | 40 | 3.2 | 8 |
| 1-5 | 14 | 4.05 | 250 | 95 | 20 | 138 | 700 | 200 | 3.2 | 8 |
| 1-6 | 14 | 4.05 | 250 | 90 | 20 | 124 | 800 | 400 | 3.1 | 8 |
| 1-7 | 14 | 5.4 | 230 | 70 | 20 | 150 | 600 | 30 | 2.9 | 7 |
| 1-8 | 14 | 4.5 | 250 | 70 | 20 | 145 | 700 | 100 | 2.9 | 7 |
| 1-10 | 18 | 5.4 | 250 | 100 | 20 | 173 | 900 | 6 | 4.1 | 12 |
| 1-11 | 9 | 4.5 | 250 | 100 | 20 | 198 | 150 | 10 | 2.05 | 4 |
| 1-12 | 9 | 4.05 | 250 | 100 | 20 | 193 | 200 | 12 | 2.05 | 4 |
| 1-13 | 9 | 4.05 | 250 | 100 | 20 | 193 | 200 | 5 | 2.05 | 8 |
| 1-14 | 14 | 5.4 | 250 | 112 | 50 | 188 | 600 | 20 | 3.3 | 9 |
| 1-15 | 14 | 5.4 | 250 | 112 | 20 | 205 | 700 | 15 | 3.3 | 9 |
| 1-16 | 14 | 5.4 | 280 | 100 | 20 | 200 | 700 | 8 | 3.2 | 8 |
| 1-17 | 14 | 5.4 | 250 | 100 | 10 | 201 | 700 | 10 | 3.2 | 8 |
| 1-18 | 14 | 5.4 | 250 | 100 | 0 | 205 | 800 | 20 | 3.2 | 8 |
| 1-19 | 14 | 5.4 | 250 | 80 | 0 | 177 | 700 | 10 | 3.0 | 7 |
| 1-21 | 14 | 5.4 | 250 | 112 | 50 | 190 | 600 | 5 | 3.3 | 6 |
| 1-22 | 14 | 5.4 | 270 | 125 | 50 | 200 | 600 | 15 | 3.4 | 6 |
| 1-23 | 14 | 5.4 | 270 | 112 | 20 | 220 |  | 10 | 3.3 | 6 |

INDUSTRIAL USE OF THE INVENTION

It is expected that this invention will be industrially important especially in removing sulfur dioxide from roasting processes and from flue gases from power plants, notably middle sized and large power plants, and in such highly efficient manner that almost no acid mist will escape to the atmosphere. The invention hence will contribute much to diminish air pollution in industrial areas.

I claim:

1. A process for producing sulfuric acid comprising condensing sulfuric acid vapors from a gas mixture containing 0.01 to 10% by vol. of $H_2SO_4$ vapor, calculated under the assumption that $SO_3$ is fully hydrated, and 0 to 50% by vol. of aqueous vapor, by direct or indirect cooling in a sulfuric acid tower, including the step of adding before inflow of the gas into the tower a smoke or an aerosol of solid particles having a content of $10^9$ to $10^{12}$ solid particles per $Nm^3$ per 0.1% $H_2SO_4$ vapor in the gas at entry thereof into the tower, calculated under the assumption that $SO_3$ in the tower is completely hydrated to $H_2SO_4$.

2. A process as claimed in claim 1, wherein the cooling of the gas mixture takes place in a packed sulfuric acid tower countercurrently with circulating sulfuric acid as coolant.

3. A process as claimed in claim 1, wherein the cooling of the gas mixture takes place in substantially vertical, externally cooled tubes in which the gas mixture flows from a bottom of the tubes in an upward direction in countercurrent with an external coolant.

4. A process as claimed in claim 3, wherein a gaseous coolant is employed.

5. A process as claimed in claim 3, further comprising condensing the sulfuric acid vapors which after the condensing flow downwards through the tubes as liquid, highly concentrated sulfuric acid, said sulfuric acid vapors originating from a feed gas containing 0.01 to 10% by vol. of $H_2SO_4$ vapor, calculated under the assumption that $SO_3$ in the tower is completely hydrated to $H_2SO_4$, and 0 to 50% by vol. of $H_2O$ vapor, the feed gas being admitted from the bottom at a temperature of at least the dew point of sulfuric acid at the conditions of pressure and temperature prevailing in the tube, the feed gas being cooled during the flow in the upward direction to an exit temperature $T_2$ which is lower than the temperature at which the vapor pressure of $H_2SO_4$ is about $2 \times 10^{-6}$ bar in equilibrium with the partial pressure of aqueous vapor prevailing at the outlet of the tubes in the top, the tubes being cooled externally with a gaseous medium flowing substantially countercurrently with the sulfuric acid-containing gas, said gaseous medium thereby being heated from an inlet temperature $TA_1$ of 0° to 50° C. to an outlet temperature $TA_2$ satisfying the condition $$TA_2 < T_4 - 30 - 10\alpha° \ C.$$

where $T_4$ is the sulfuric acid dew point, expressed in ° C., of the gas passed to the tubes and $\alpha$ is % by vol. of sulfuric acid vapor, calculated under the assumption that $SO_3$ in the gas is completely hydrated to $H_2SO_4$.

6. A process as claimed in claim 5, further comprising means for separating droplets of sulfuric acid present in the gas mounted near, in or on top of each tube in gas tight connection therewith, said droplets flowing back from said means, downwards through the tube.

7. A process as claimed in claim 1, wherein solid particles having a diameter below 1 $\mu$m are added to the gas.

8. A process as claimed in claim 7, wherein solid particles having a diameter of 0.002 to 0.1 $\mu$m are added to the gas.

9. A process as claimed in claim 1, further comprising the step of purifying feed gas for contents of solid particles originally present before adding the solid particles.

10. A process as claimed in claim 1, wherein the step of adding the solid particles comprises adding the solid particles to a feed gas stream containing $SO_2$ and a stoichiometric excess of $H_2O$, said gas stream thereafter being passed through a layer of a sulfuric acid catalyst at a temperature of 360° to 500° C. to oxidize $SO_2$ to $SO_3$, the $SO_3$ being hydrated under the influence of aqueous vapor.

11. A process is claimed in claim 10, further comprising the step of cooling the gas stream to a temperature in the range of 0° to 200° C. above the sulfuric acid dew point of the gas stream before admitting the gas stream into the sulfuric acid tower.

12. A process as claimed in claim 1, wherein the step of adding the solid particles comprises adding smoke from combustion of hydrocarbons in a burner to the gas mixture, the air fuel ratio in the burner being continually adjusted by means of an automatic regulation loop containing an analyzer for measuring sulfuric acid droplets content in the gas mixture after the gas has left the sulfuric acid tower, signals from the analyzer continually adjusting and correcting the air/fuel ratio.

13. A process as claimed in claim 1, wherein the step of adding the solid particles comprises adding smoke from the combustion of hydrocarbons to the gas mixture, the amount of smoke from the combustion of hydrocarbons added being continually adjusted by means of an automatic regulation loop containing an analyzer for measuring sulfuric acid droplets content in the gas mixture after it has left the sulfuric acid tower, signals from the analyzer continually adjusting and correcting the amount of smoke admitted.

14. A process as claimed in claim 12, wherein the smoke from the combustion of hydrocarbons contains at least 2 carbon atoms per molecule.

15. A process as claimed in claim 1, wherein the step of adding the solid particles comprises adding the particles in the form of smoke from metal or metal oxides generated in an electric arc.

16. A process as claimed in claim 1, further comprising the step of setting the automatic regulation loop so as to ensure a sulfuric acid droplets content in discharge gas below 10 ppm of $H_2SO_4$.

17. A process as claimed in claim 1, wherein the step of adding the solid particles comprises adding the particles as an aerosol of a solution of a metal salt or a suspension of particles, liquid present in the aerosol being evaporated before the aerosol reaches the sulfuric acid tower.

18. A process as claimed in claim 10 wherein the feed gas stream is a stream of dust-containing fuel gas from combustion of fossil fuel, and
 (i) the gas stream is divided before reaching the catalyst or between the catalyst and the sulfuric acid tower into a first stream from which substantially all particles are removed and a second stream from which at most particles having a diameter above about 0.5 μm are removed, and
 (ii) the first and second streams are united before reaching the sulfuric acid tower.

19. A process as claimed in claim 1, wherein the step of adding the solid particles comprises providing the particles by combusting together with a fluid fuel, a silicon-containing component selected from the group consisting of silicone oils and siloxanes, smoke from the combustion of the silicon-containing component being admixed into the gas mixture.

* * * * *